United States Patent [19]

Billieres

[11] Patent Number: 5,318,088
[45] Date of Patent: Jun. 7, 1994

[54] RIM WITH INCLINED SEATS AND ASSEMBLY OF SUCH A RIM WITH A TIRE

[75] Inventor: Jean Billieres, Clermont-Ferrand, France

[73] Assignee: Compagnie Generale des Etablissements Michelin - Michelin & Cie, Clermont-Ferrand Cedex, France

[21] Appl. No.: 915,848

[22] PCT Filed: Nov. 8, 1991

[86] PCT No.: PCT/EP91/02121
    § 371 Date: Jul. 22, 1992
    § 102(e) Date: Jul. 22, 1992

[87] PCT Pub. No.: WO92/10373
    PCT Pub. Date: Jun. 25, 1992

[30] Foreign Application Priority Data

Dec. 4, 1990 [FR] France .................. 90/15270

[51] Int. Cl.⁵ .................................. B60B 21/02
[52] U.S. Cl. .......................... 152/379.3; 152/381.4
[58] Field of Search ........... 152/379.3, 379.4, 379.5, 152/381.3, 381.4

[56] References Cited

U.S. PATENT DOCUMENTS 2,731,064  1/1956  Powers .
5,186,772  2/1993  Nakasaki et al. .......... 152/379.3 X

FOREIGN PATENT DOCUMENTS 1127147  10/1956  France .
1584554  11/1981  United Kingdom .

OTHER PUBLICATIONS

Patent Abstracts of Japan, vol. 14, No. 393 (M-1015) [4336] Aug. 24, 1990, Sumitomo Rubber Ind. Ltd., Jun. 6, 1990.
Patent Abstracts of Japan, vol. 8, No. 16 (M-270) [1453] Jan. 24, 1984, Bridgestone Tire K.K., Oct. 18, 1983.

*Primary Examiner*—Russell D. Stormer
*Attorney, Agent, or Firm*—Brumbaugh, Graves, Donohue & Raymond

[57] ABSTRACT

An integral rim (J') having frustoconical seats (2') inclined 15°±1°, the axial widths (P') of which are greatly decreased as compared with the axial widths (P) of the known frustoconical seats (2), and having a mounting groove (3') of reduced height (H') so as to permit an increase in the space available for the braking means. The assembly of a rim (J') as described above and of a tire (T) having beads the tips of which have been truncated permits better resistance of said beads to fatigue while permitting easy mounting. The invention is employed for tires and rims intended for heavy vehicles.

2 Claims, 2 Drawing Sheets

RIM WITH INCLINED SEATS AND ASSEMBLY OF SUCH A RIM WITH A TIRE

BACKGROUND OF THE INVENTION

The present invention relates to an integral rim with frustoconical seats inclined 15°±1° on which it is intended to mount a tire of the "heavy vehicle" type without independent air tube. It also concerns one assembly of such a rim with a tire, the beads of which have seats of adapted shape.

Such known assemblies, which are very widely used, have significant advantages: the danger of the throwing off of metal parts being eliminated, greater safety is assured; as the tires used are tires without independent air tube, the absence of the latter and of the flap results in a substantial saving, while avoiding rubbing and pinching between tire, tube and rim, and thus heating and puncture of the inner tube.

The known rims with 15° inclined seats have dimensions which are standardized in accordance with the international standards in force (T.R.A.; ETRTO). Tires having beads with frustoconical seats are mounted on such rims in known manner. The generatrix of a seat is either linear forming an angle of generally between 15° and 20° with the axis of rotation of the tire, or is formed of two segments, one inclined 15° and the other, which extends the first axially towards the inside, being inclined by an angle of more than 15°, and even more than 25°. The standard rims are provided in their central portion with a so-called mounting groove which permits the mounting of the tire on the rim. The radially inside diameter of this groove is a major obstacle to the selection of brake drums or disk brake calipers of large diameter, which would permit greater braking efficiency.

Any increase in the diameter of the mounting groove without any other change, either of the beads of the tire intended to be mounted or of the other parts of the rim, makes the mounting of the tire practically impossible.

SUMMARY OF THE INVENTION

The object of the invention is to be able to increase the diameter of the mounting groove of standard rims having inclined seats of 15° and nevertheless permit the mounting of ordinary tires having beads the frustoconical seats of which are adapted to standard rims.

The rim J', in accordance with the invention, of standard nominal diameter $D_N$ and standard axial width A and having seats inclined by an angle of 15°±1° with respect to the axis of rotation is characterized by the fact that, seen in meridian section, the axial width P' of each of its seats is between 35% and 55% of the standard minimal width P of each of the frustoconical seats of the standard rim J having the same nominal diameter $D_N$ and the same axial width A, and by the fact that its mounting groove has a depth H' between 65% and 75% of the depth H of the mounting groove of the reference rim J, said groove of the rim J' being connected on the mounting side of the tire directly to the frustoconical seat and, on the side opposite the mounting side of the tire, to a cylindrical part of diameter identical to the diameter of the cylindrical part of the reference rim J, said cylindrical part being connected to the frustoconical seat by two axially adjacent circular arcs of the same radius.

If such a rim permits the mounting of present-day tires having beads with frustoconical seats, the generatrices of which form either a single angle or two different angles with the axis of rotation, the assembly formed by the rim described above and a tire, the beads of which have seats of adapted shape is particularly advantageous.

In accordance with the invention, said assembly comprises a tire having bead seats of a diameter at most equal to the diameter $D_N$ of the mounting rim and the meridian profile of which is formed of a portion inclined by an angle of between 15° and 20° and of an axial width $L_0$ of between 90% and 110% of the width P, of the rim seat J', which portion is extended axially towards the inside by a portion forming an angle of between 5° and 0° with the axis of rotation of the assembly and of a width at most equal to the width $L_0$.

By diameter of a bead, there is to be understood the diameter measured at the intersection of the frustoconical generatrix of the bead seat and the axially outer wall of said bead, the wall being substantially vertical.

From French Patent 1 127 147, it is known that the seat of a bead the width of which is practically equal to the width of the seat of a rim of standard dimensions results in extensive sliding between the axially inner part of the tip of the bead and the rim, this sliding giving rise to wear of said tip. That patent teaches truncating the tip of the bead so that the contact between said tip and the rim is eliminated, as is also the wear which results therefrom, whether this be wear of the bead or wear of the rim. The patent does not concern the mounting of a tire having 15° frustoconical bead seats on a rim the mounting groove of which has a depth which is less than the standardized depth.

In addition to the fact that the assembly in accordance with the invention also permits less wear of the inner tip of the bead, the fact that this tip is at a large distance from the rim in accordance with the invention permits less heating of the bead, with, as beneficial consequence, better endurance of the bottom region of the tire. In particular, the unwinding of the carcass reinforcement from around the bead wire is avoided. Similarly, the rubber tip, retaining its initial properties and not becoming hardened by heating, withstands much better the forces imposed upon the dismounting of the tire and the injuries which occur.

DESCRIPTION OF DRAWINGS

The invention will be more clearly understood by reference to the accompanying drawings which illustrate one non-limitative embodiment, and in which.

DESCRIPTION OF PREFERRED EMBODIMENTS

Figure 1:
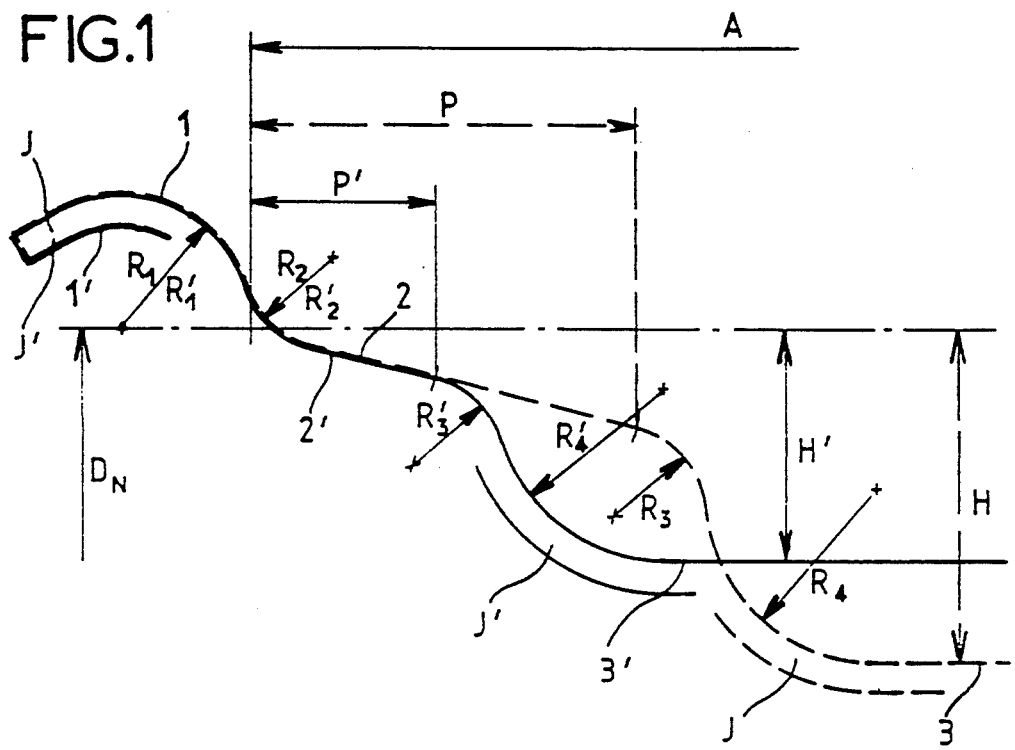
FIG. 1 shows, as compared with the meridian profile of a present-day standard rim which is shown in dashed lined, the meridian profile of the mounting rim for the assembly in accordance with the invention, shown in solid lines, these profiles being those present on the mounting side of the tire.

The meridian contour of a rim J having seats 2 inclined 15°±1° is formed primarily, in accordance with the international standards, of a circular rim flange 1 of constant radius $R_1$, whatever the width A and the nominal diameter $D_N$ of the rim, which flange is connected to the inclined seat 2 by a circular portion of radius $R_2$, which is also constant. The inclined seat 2 extends over an axial distance P the minimum value of which, in accordance with the standards (ETRTO), varies between 25 and 36 mm, depending on the dimensions of the rim. On the mounting side of the tire, the seat 2 is connected to the mounting groove 3 by a series of two circular arcs of radius $R_3$ and $R_4$ of 8 and 16 mm, respectively. The groove 3 has a minimum depth H as well as a minimum width which must be respected for the proper mounting of the tire, said depth and width being standardized.

If one considers the side opposite the mounting side of the tire, the rim flange 1 and the seat 2 are symmetrical to the flange 1 and the seat 2 on the mounting side. On the other hand, the seat 2 is extended axially towards the inside by a cylindrical part 4 of a width such that the axial width of the rim and the axial width of its mounting groove are respected.

This cylindrical part 4 furthermore has a diameter less than or equal to $D_N-22$ mm, depending on the rim size.

Figure 2:
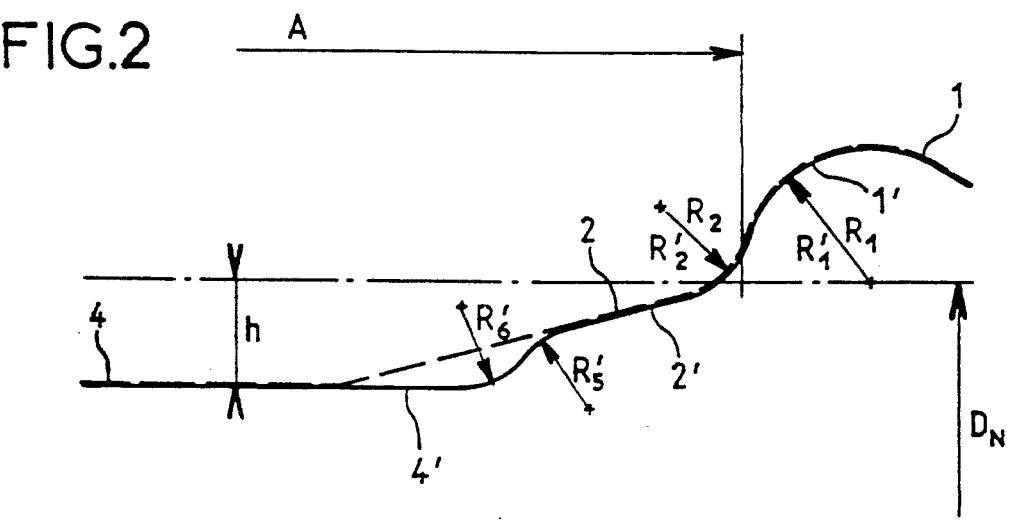
FIG. 2 shows the same meridian profiles but on the side opposite the mounting side of the tire.

As compared with this standard meridian profile such as shown in FIGS. 1 and 2, the meridian profile of the rim J' in accordance with the invention has a seat 2, the axial width P' of which is equal, in the case studied of a 22.5-8.25 rim for a 295/80.22.5 tire, to 47% of the axial width P of 36 mm of the seat 2 of the reference rim J. This seat 2' is connected, on the mounting side of the tire, to a rim flange 1' which is identical to the rim flange 1 and, on the other side, to the mounting groove 3' via two circular arcs of radii $R'_3$ and $R'_4$ equal to the corresponding radii $R_3$ and $R_4$ of 8 mm/and 16 mm of the reference rim J. The mounting groove 3' then has a depth H' equal to 21 mm, namely 0.7 H, H being equal to 30 mm in the case of the reference rim J.

On the side opposite the mounting side of the tire, the meridian profile of the rim J' has a flange and a seat which are symmetrical to the flange 1' and seat 2' on the mounting side of the tire. On the other hand, the seat 2' is connected to the cylindrical part 4' of a diameter identical to the cylindrical part 4 of the reference rim J by a sequence of two circular arcs of radii $R'_5$ and $R'_6$ equal to the radius $R'_3$ of 8 mm.

As to the tire T (FIG. 3), it is provided with a radial carcass reinforcement 10 and a crown reinforcement consisting of at least two plies of crossed cords or cables (not shown). The carcass reinforcement 10 is anchored in each bead to a bead ring 11 consisting in the present case, of rectangular cords, and forms an upturn 12. The meridian profile of the bead, intended to come into contact with the rim, is formed primarily of a vertical part 21 connected to the bead seat 22 by a rounding of small radius. This seat 22 of axial width $L_0$ equal to the width P' of the seat 2' of the mounting rim J' is inclined by an angle $\alpha$ of 18° with respect to the axis of rotation of the tire-rim assembly. The fact that the diameter $D_N$ of the bead is 3 mm less than the diameter $D_N$ of the rim J' and the fact that the angle of inclination of the bead seat is greater than the angle of inclination of the rim seat have the result that the clamping of the bead on the rim J' is sufficient to assure correct tightness and a good holding of the bead on the rim as a function of the stresses imposed upon the tire.

Figure 3:
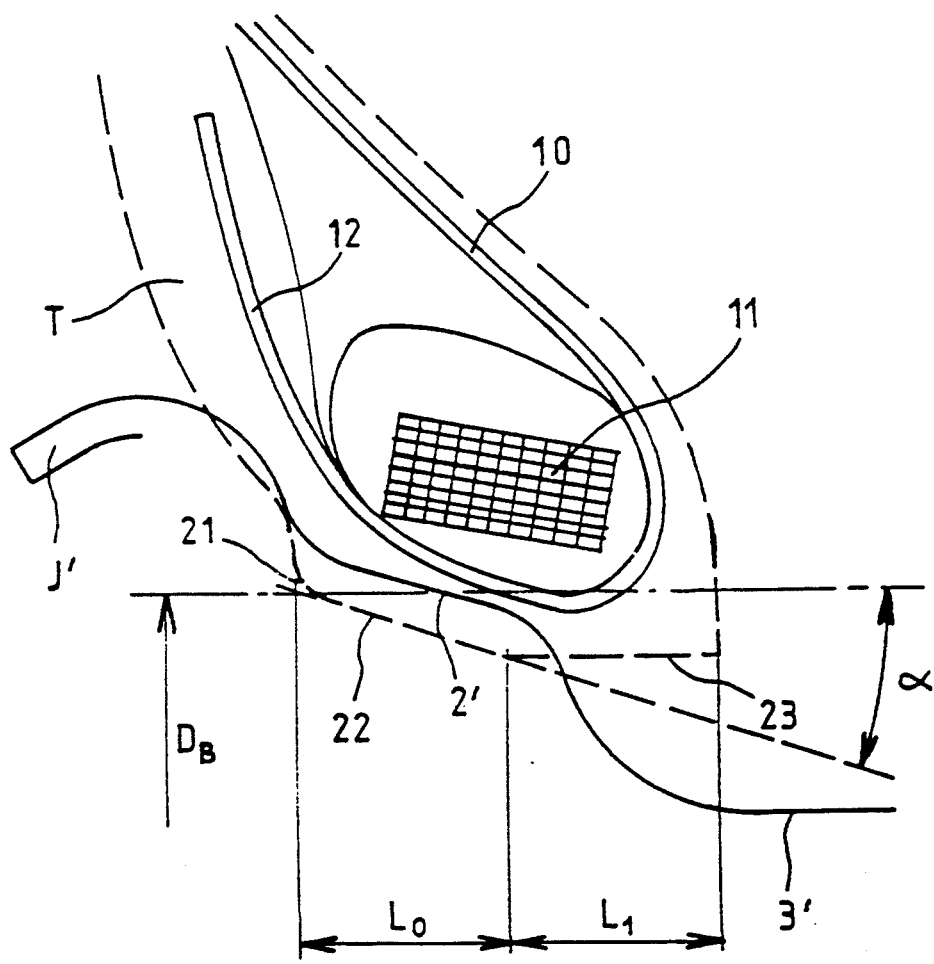
FIG. 3 shows the tire-rim assembly in mounted condition with, in dashed lines, the meridian contour of the bead of the tire not mounted on the rim.

The seat 22 is extended axially toward the inside by a portion 23 which is parallel to the axis of rotation so as to form the tip of the bead which, as shown in FIG. 3, does not come into contact with the rim. The axial width $L_1$ of this portion 23 is equal to the width $L_0$ of the portion 22.

I claim:

1. A rim (J') having the nominal diameter (DN) and the axial width (A) of a standardized rim (J), and comprising, seen in meridian section, two flanges (1'), two frustoconical seats (2') inclined by an angle of 15°±1° with respect to the axis of rotation, each seat (2') having an axial width (P') between 35% and 55% of the standardized nominal width (P) of each frustoconical eat (2) of the standardized rim (J), a mounting groove (3') of depth (H') of which is between 65% and 75% of the depth (H) of the mounting groove (3) of the standardized rim (J) and being connected on a one side directly to a first bead seat (2') and on the other side to a cylindrical part (4') of a diameter identical to the diameter of the cylindrical part (4) of the standardized rim (J), the said cylindrical part (4') being connected to the seat (2') by two axially adjacent circular arcs of equal radii (R'6, R'5).

2. A rim and tire assembly, comprising a rim (J') having the nominal diameter (DN) and the axial width (A) of a standardized rim (J) and comprising, seen in meridian section, two flanges (1'), two frustoconical seats (2') inclined by an angle of 15°±1° with respect to the axis of rotation, each seat (2') having an axial width (P') being between 35% and 55% of the standardized nominal width (P) of each frustoconical (2) of the standardized rim (J), and a tubeless tire (T) for a heavy vehicle, having a radial carcass reinforcement (10) and bead seats (22, 23), an inner diameter at most equal to the diameter (DN) of the mounting rim (J') and an inner meridian profile formed of a bead seat portion (22) inclined by an angle $\alpha$ of between 15° and 20° and of an axial width (L0) of between 90% and 110% of the width (P') of the rim seat (J'), extended axially to the inside by a bead seat portion (23) which forms an angle of between 5° and 0° with the axis of rotation of the assembly and of a width (L1) at most equal to the axial width (L0) of the inclined bead seat portion (22).

* * * * *

UNITED STATES PATENT AND TRADEMARK OFFICE
CERTIFICATE OF CORRECTION

PATENT NO. : 5,318,088
DATED : June 7, 1994
INVENTOR(S) : Jean Billieres

It is certified that error appears in the above-indentified patent and that said Letters Patent is hereby corrected as shown below:

Column 2, line 11, "P," should read --P'--;

Column 3, line 26, "seat 2," should read --seat 2'--;

Column 3, line 34, "8 mm/" should read --8 mm--;

Column 4, line 3, "$D_N$" should read --$D_B$--;

Column 4, line 24, "eat (2)" should read --seat (2)--;

Column 4, line 42, "frustoconical (2)" should read --frustoconical seat (2)--.

Signed and Sealed this

Sixteenth Day of May, 1995

BRUCE LEHMAN

Attest:

Attesting Officer          Commissioner of Patents and Trademarks